(12) United States Patent
Ueberschlag et al.

(10) Patent No.: US 9,200,946 B2
(45) Date of Patent: Dec. 1, 2015

(54) ULTRASONIC TRANSDUCER FOR AN ULTRASONIC FLOW MEASURING DEVICE

(71) Applicant: Endress + Hauser Flowtec AG, Reinach (CH)

(72) Inventors: Pierre Ueberschlag, Saint-Louis (FR); Michael Bezdek, Aesch (CH); Andreas Berger, Hasel (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 357 days.

(21) Appl. No.: 13/726,759

(22) Filed: Dec. 26, 2012

(65) Prior Publication Data

US 2013/0205904 A1  Aug. 15, 2013

(30) Foreign Application Priority Data

Dec. 29, 2011  (DE) .................... 10 2011 090 079

(51) Int. Cl.
*G01H 11/06* (2006.01)
*G01F 1/66* (2006.01)
*H04R 31/00* (2006.01)

(52) U.S. Cl.
CPC ............. *G01H 11/06* (2013.01); *G01F 1/667* (2013.01); *H04R 31/00* (2013.01); *Y10T 29/49005* (2015.01)

(58) Field of Classification Search
CPC ........ G01H 11/06; H04R 31/00; G01F 1/667; Y10T 29/49005
USPC .................................... 73/644; 310/327, 346
See application file for complete search history.

(56) References Cited

U.S. PATENT DOCUMENTS

| | | | |
|---|---|---|---|
| 3,036,231 A | | 5/1962 | Henry |
| 3,059,130 A | | 10/1962 | Robins |
| 3,925,692 A | * | 12/1975 | Leschek et al. ............... 310/327 |
| 3,960,018 A | | 6/1976 | Change |
| 4,156,158 A | | 5/1979 | Wilson et al. |
| 4,297,607 A | | 10/1981 | Lynnworth |
| 4,742,717 A | | 5/1988 | Ichino |
| 4,746,831 A | * | 5/1988 | Ichino ........................... 310/334 |
| 4,825,709 A | * | 5/1989 | Nordvall ................... 73/862.69 |
| 5,886,456 A | * | 3/1999 | Stubbs et al. ................. 310/336 |

(Continued)

FOREIGN PATENT DOCUMENTS

| | | |
|---|---|---|
| DE | 28 35 367 A1 | 3/1979 |
| DE | 4443415 A1 | 6/1996 |

(Continued)

OTHER PUBLICATIONS

German Search Report, Aug. 14, 2012, Munich.

(Continued)

*Primary Examiner* — J M Saint Surin
(74) *Attorney, Agent, or Firm* — Bacon & Thomas, PLLC

(57) ABSTRACT

An ultrasonic transducer for an ultrasonic flow measuring device, comprising an electromechanical transducer element, which is prestressed against an ultrasonic window of the ultrasonic transducer by a suitable structure, wherein a first surface of the electromechanical transducer element faces the ultrasonic window, and wherein a second surface of the electromechanical transducer element lying opposite the first surface is divided into a plurality of segments, which are galvanically connected with the suitable structure for prestressing.

11 Claims, 1 Drawing Sheet

(56) References Cited

U.S. PATENT DOCUMENTS

| | | | |
|---|---|---|---|
| 7,669,483 B1 * | 3/2010 | Feller | 73/861.27 |
| 8,127,613 B2 | 3/2012 | Van Klooster | |
| 8,413,524 B2 | 4/2013 | Nakano | |
| 2007/0007862 A1 | 1/2007 | Adachi | |
| 2009/0095088 A1 * | 4/2009 | Berger et al. | 73/861.25 |
| 2012/0125121 A1 | 5/2012 | Gottlieb | |

FOREIGN PATENT DOCUMENTS

| | | |
|---|---|---|
| DE | 10 2005 003 398 A1 | 8/2006 |
| DE | 102009032809 A1 | 9/2010 |
| DE | 102009027355 A1 | 5/2011 |
| EP | 0260335 A1 | 3/1988 |
| EP | 0 766 071 A1 | 4/1997 |
| EP | 1 498 700 A2 | 1/2005 |
| EP | 1 840 530 A2 | 10/2007 |
| EP | 2252076 A1 | 11/2010 |
| WO | WO 88/03691 | 5/1988 |

OTHER PUBLICATIONS

International Search Report in PCT/EP2012/073386, dated Jan. 30, 2013.
English translation of IPR, WIPO, Geneva, Jul. 10, 2014.
German Search Report, Geman PTO, Munich, Aug. 14, 2012.

* cited by examiner

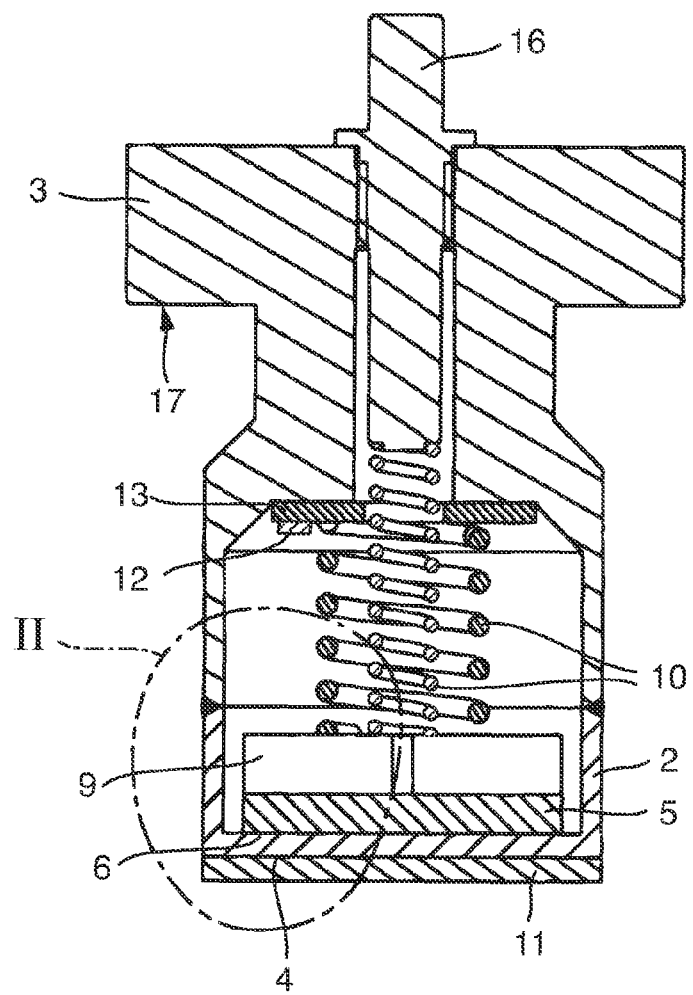
Fig. 1
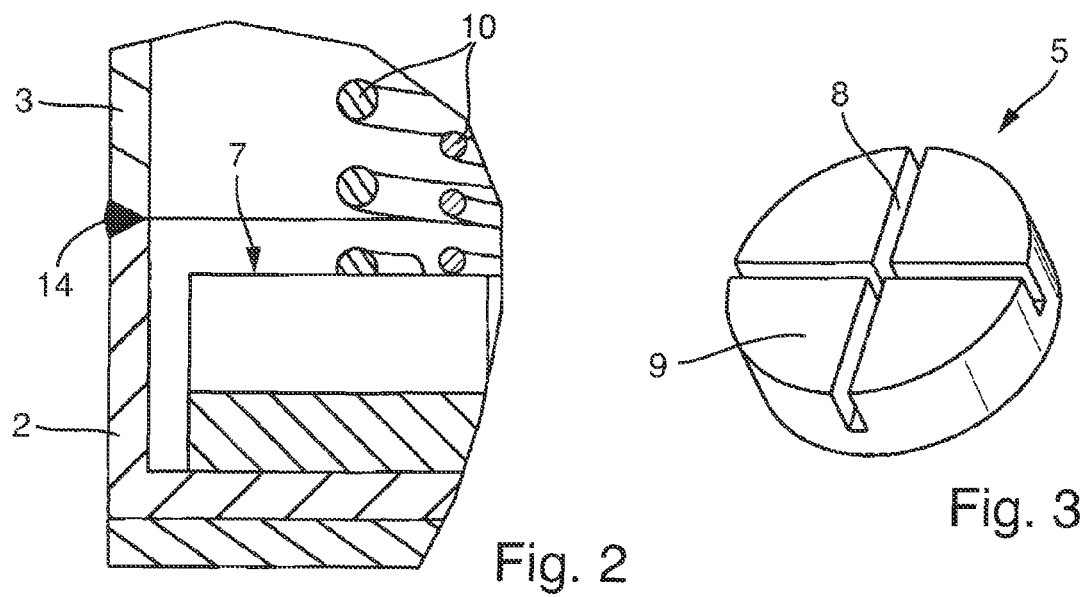
Fig. 2
Fig. 3

ULTRASONIC TRANSDUCER FOR AN ULTRASONIC FLOW MEASURING DEVICE

TECHNICAL FIELD

The present invention relates to an ultrasonic transducer for an ultrasonic flow measuring device, wherein the transducer includes an electromechanical transducer element, which is prestressed against an ultrasonic window of the ultrasonic transducer by suitable means, wherein a first surface of the electromechanical transducer element faces the ultrasonic window.

BACKGROUND DISCUSSION

Ultrasonic flow measuring devices are applied often in process- and automation technology. They permit, in a simple manner, the determination of volume flow and/or mass flow in a pipeline.

Known ultrasonic flow measuring devices work frequently according to the travel-time difference principle. According to the travel-time difference principle, the different travel times of ultrasonic waves, especially ultrasonic pulses, so-called bursts, are evaluated relative to the flow direction of the fluid. For this, ultrasonic pulses are sent at a certain angle to the tube axis both with the flow as well as also counter thereto. From the travel-time difference, the flow velocity and therewith, in the case of known diameter of the pipeline section, the volume flow can be determined.

The ultrasonic waves are produced, respectively received, with the aid of so-called ultrasonic transducers. For this, ultrasonic transducers are mounted in the tube wall of the relevant pipeline section. The ultrasonic transducers are, normally, composed of an electromechanical transducer element, e.g. a piezoelectric element, and an ultrasonic window. The ultrasonic waves are produced as acoustic signals in the electromechanical transducer element and led to the ultrasonic window and from there in-coupled into the fluid, or measured medium. The ultrasonic window is also referred to as a membrane.

Between the piezoelectric element and the ultrasonic window, a so called adapting, or matching, layer can be arranged. The adapting, or matching, layer performs, in such case, the function of transmission of the ultrasonic signal and simultaneously the reduction of a reflection on interfaces between two materials caused by differing acoustic impedances.

WO 2011/000634 A1 discloses an ultrasonic transducer with an ultrasonic window, against which an electromechanical transducer element is prestressed. Arranged between the electromechanical transducer element and the ultrasonic window is a ductile, solid body as coupling layer.

U.S. Pat. No. 6,508,133 B1 shows an electromechanical transducer element connected with an ultrasonic window by material bonding, wherein the surface of the electromechanical transducer element, which contacts the ultrasonic window, is divided into a number of segments.

EP 0 766 071 A1 describes an ultrasonic transducer having between an electromechanical transducer element and an ultrasonic window a coupling means composed of a matrix with hollow glass bodies embedded therein.

An object of the invention is to provide an ultrasonic transducer, which is suitable for measuring gas flow.

SUMMARY OF THE INVENTION

The object is achieved by an ultrasonic transducer of the invention for an ultrasonic flow measuring device, especially for gas applications, e.g. for measuring flow of biogas, includes an electromechanical transducer element, for example, a piezoelectric element, a housing with an ultrasonic window and means for prestressing the electromechanical transducer element against the ultrasonic window. In such case, a first surface of the electromechanical transducer element bears against the ultrasonic window. In given cases, an intermediate ply of a coupling means, such as fat, oil or a ductile, solid material, such as e.g. lead or gold, is provided between the electromechanical transducer element and the ultrasonic window. The electromechanical transducer element is, in such case, not connected with, e.g. adhered to, the ultrasonic window by material bonding, as it is in the state of the art. Correspondingly, the first surface of the electromechanical transducer element faces the ultrasonic window.

According to the invention, a second surface of the electromechanical transducer element lying opposite the first surface is divided into a plurality of segments, which are galvanically connected with the means for prestressing.

As in U.S. Pat. No. 6,508,133 B1, also the electromechanical transducer element of the invention has cuts in planes, which extend parallel to a longitudinal axis of the electromechanical transducer element. The cuts, in such case, do not, however, go all the way through. Instead, each cut is in the form of a deep groove. The first surface is planar according to a further development of the invention. In an additional further development, the second surface of the electromechanical transducer element is divided into four segments. With reference to their surface area, the segments are approximately the same size. The segments have, in each case, the shape of a quarter circle, the cuts form, thus, a plus sign in the cross section through the electromechanical transducer element. Other than in the case of U.S. Pat. No. 6,508,133 B1, however, the surface of the electromechanical transducer element subdivided into the segments faces away from the ultrasonic window. The segments of the second surface lie in a plane and form the uncut part of the second surface of the electromechanical transducer element.

In an embodiment of the ultrasonic transducer of the invention, the cut depth, thus the distance from the groove bottom of the groove formed by the cut to the uncut part of the second surface, amounts to at least 50%, especially at least 80% of the distance from the first surface to the uncut part of the second surface of the electromechanical transducer element, wherein the last named distance is the thickness of the electromechanical transducer element. The first surface and the uncut part of the second surface of the electromechanical transducer element especially extend parallel to one another.

The electromechanical transducer element is, according to the invention, prestressed against the ultrasonic window. This happens by means of a predetermined force, which is applied on the second surface of the electromechanical transducer element by the means for prestressing and acts in the direction of the ultrasonic window. The means for prestressing can be springs, for example, especially exactly one spring. It can, however, also be two or more springs, for example, concentrically arranged, compression coil springs. Advantageous, however, is a force distributed uniformly over the segments and that the segments can be equally excited to execute oscillations. In this regard, the individual segments of the second surface of the electromechanical transducer element are electrically contacted by the spring; especially, they are galvanically connected with the spring.

In a further development of the ultrasonic transducer of the invention, the means for prestressing comprises a compression coil spring, which, for galvanic contacting of the segments of the second surface of the electromechanical transducer element, has at least one complete winding extending in a plane.

In a further development, the compression coil spring includes, for galvanic contacting of the segments of the second surface of the electromechanical transducer element, at least two planar, spiral shaped windings.

Especially, the at least one, especially the two, spiral shaped windings bear against the segments of the electromechanical transducer element and therewith against the uncut part of the second surface. They lie in a plane parallel to the plane of the uncut part of the second surface of the electromechanical transducer element. If the two windings are considered separately, each is a planar spiral with an angle of at least 720°.

Using a number of windings in the region of the transducer element, the contact surface between spring and electromechanical transducer element is enlarged in comparison to a conventional compression coil spring. A conventional compression coil spring is at least sectionally helical or conical.

Another further development of the invention is that in which the ultrasonic transducer has an adapting, or matching, layer, especially for acoustic impedance matching, which interfaces the ultrasonic transducer with its environment, wherein the ultrasonic window is arranged between the electromechanical transducer element and the adapting, or matching, layer. An acoustic impedance matching occurs especially between electromechanical transducer element, respectively the ultrasonic window, and a fluid, whose flow through a pipeline is to be measured by means of the ultrasonic transducer. The acoustic impedance of the adapting, or matching, layer is, in a further development, less than 1 MRayl. In this case, the fluid has a smaller acoustic impedance, for example, 400 Rayl or 360 Rayl, and the electromechanical transducer element a greater acoustic impedance, which are matched to one another by the adapting, or matching, layer. The acoustic impedances of the electromechanical transducer element and the ultrasonic window lie in a range of 10 to 60 MRayl, especially in the range 30 to 40 MRayl. In a form of embodiment of the invention, acoustic impedances of the electromechanical transducer element and the ultrasonic window are approximately equal.

In a further development, the adapting, or matching, layer comprises a composite matrix, for example, of resin, especially of epoxide resin, with therein embedded, spherically shaped bodies, for example, glass spheres, hollow glass spheres or hollow ceramic spheres.

An ultrasonic transducer of the invention is, thus, for example, constructed in the following way. On a housing, which otherwise borders the ultrasonic transducer from the environment, an adapting, or matching, layer is applied in the region of the ultrasonic window. This layer provides with its outer contour an interface of the ultrasonic transducer with the environment. The housing of the ultrasonic transducer can be exposed in its totality, or only in parts, to a fluid to be measured. Especially, the ultrasonic window or, when present, the adapting, or matching, layer forms the interface with the fluid. In this way, an acoustic signal is coupled by the ultrasonic transducer into, or out of, the fluid. The housing surrounds, in such case, the electromechanical transducer element, a coupling means arranged, in given cases, between the electromechanical transducer element and the ultrasonic window, and the means for prestressing, or biasing, the electromechanical transducer element against the ultrasonic window.

In an additional further development, it is provided that the ultrasonic transducer is so embodied that the ultrasonic window contacts the first surface of the electromechanical transducer element galvanically, wherein the ultrasonic window and the means for prestressing are suitable for applying and/or tapping a voltage to, respectively from, the electromechanical transducer element. In such case, the housing is correspondingly electrically conductive and serves as electrode for electrical contacting of the electromechanical transducer element. A separate electrode is not necessary for this.

If the means for prestressing are galvanically connected with the ultrasonic window, for example, by means of the housing of the ultrasonic transducer, the galvanic connection has a resistance of at least 50 ohm. Especially, the resistor has a resistance of at least 1000 ohm.

For example, the means for prestressing is supported on an electrically non-conductive component of the ultrasonic transducer, for example, on a circuit board, which contacts the housing. A separate electrical conductor, for example, a conductive trace on the circuit board, establishes the galvanic connection between the means for prestressing and the housing, respectively the ultrasonic window, for example, with interpositioning of an electrical resistance of predetermined size. The means for prestressing are electrically conductive.

Another further development of the invention provides that the ultrasonic transducer includes a housing, which has lugs extending toward the electromechanical transducer element for centering the electromechanical transducer element in the housing.

In an additional further development, the ultrasonic transducer includes a housing, which has a beaker shaped, first housing part, whose floor forms the ultrasonic window and on which the electromechanical transducer element is arranged, and which housing has a second housing part, with an axial stop for securement of the ultrasonic transducer on or in a measuring tube, wherein a function of the distance of each section edge of an outer contour of the housing to a longitudinal axis of the housing is monotonic from the ultrasonic window up to the axial stop, wherein the section edge lies in a plane, in which the longitudinal axis of the housing lies.

In an additional embodiment of the ultrasonic transducer of the invention, each angle, which the section edge makes with the longitudinal axis of the housing of the ultrasonic transducer, is less than 60°.

Another form of embodiment of the invention provides that the second housing part has an opening with an essentially circularly shaped cross section, wherein also the electromechanical transducer element has an essentially circularly shaped cross section and wherein the radius of the electromechanical transducer element is greater than the radius of the opening by at least 10%. The opening serves e.g. for containing an electrical conductor for electrical contacting of the electromechanical transducer element.

In a further development, the first housing part is connected with the second housing part by material bonding, especially welded, especially with laser. Since the electromechanical transducer element contacts the ultrasonic window, in given cases, with interpositioning of a coupling layer, heat led to the ultrasonic window, stemming from the welding, must be limited, in order not to damage the electromechanical transducer element and/or the coupling layer. Therefore, the temperature of the ultrasonic window should reach no more than 120° C., especially no more than 80° C.

To achieve this, the cross sectional area A of a housing wall of the first housing part, the distance d of the connecting surfaces of the first and second housing parts to the ultrasonic window, thus the distance of the weld seam to the ultrasonic window, and the material of the first housing part are so matched to one another, that the ultrasonic window is heated to a temperature of less than 80° C. Stainless steel as material for the first housing part has typically a thermal conductivity of 10 to 100 W/(m*K).

A so embodied ultrasonic transducer is produced according to the invention by placing the electromechanical transducer element in the first or second housing part, especially by inserting it into the first housing part, especially placed against the ultrasonic window, for example, with interpositioning of a coupling means, and then the second housing part is placed on the first housing part, especially surrounding the means for prestressing, and then the first housing part is connected with the second housing part by material bonding, especially by welding the first and second parts together, especially by means of laser and especially in such a manner that the ultrasonic window is heated to a temperature of less than 80° C.

BRIEF DESCRIPTION OF THE DRAWINGS

The invention can be embodied in numerous ways. Some of these will now be explained in greater detail based on the figures of the drawing. Equal elements are provided in the figures with equal reference characters. The figures of the drawing show as follows:

FIG. 1 is a sectional view of an ultrasonic transducer of the invention;

FIG. 2 is a detail of FIG. 1; and

FIG. 3 is an electromechanical transducer element of the invention.

DETAILED DISCUSSION IN CONJUNCTION WITH THE DRAWINGS

FIG. 1 shows an ultrasonic transducer 1 of the invention in section, details of which are shown in FIGS. 2 and 3. The housing of the ultrasonic transducer 1 includes a first housing part 2 and a second housing part 3, which are connected with one another by material bonding by means of a weld seam 14. The first housing part 2 has a beaker shape and includes an ultrasonic window 4 as a floor. It surrounds an electromechanical transducer element 5, which is arranged against the ultrasonic window 4 and prestressed to bear against such by suitable means 10. A coupling means (not shown) can be inserted between the electromechanical transducer element 5 and the ultrasonic window 4.

Since the second housing part 3 has in a lower region of FIG. 1 a shell shape congruent with the walls of the first housing part 2, in order to be able to connect it therewith, while being conically tapered in an upper region, the electromechanical transducer element 5 and the, in given cases present, coupling means are inserted before the connecting of the first and second housing parts 2 and 3. In order, however, not to damage these during the connecting, the cross sectional area A of a housing wall of the first housing part 2, the distance d of the connecting surface of first and second housing parts 2 to the ultrasonic window 4, thus the distance of the weld seam 14 to the ultrasonic window 4, and the material of the first housing part are selected and matched to one another. Stainless steel as material for the first housing part 2 has typically a thermal conductivity of 10 to 100 W/(m*K). The second housing part 3 is composed especially of the same material as the first housing part 2. The two housing parts 2 and 3 are welded, consequently, especially by means of laser.

Provided as prestressing means 10 are here two compression coil springs 10. They produce predetermined forces in the direction of the ultrasonic window 4 and apply such to the electromechanical transducer element 5, whereby element 5 is pressed to bear against the ultrasonic window 4. At the same time, the means 10 for prestressing contact the electromechanical transducer element 5 electrically. Thus, the applying of one or more additional electrodes on the electromechanical transducer element 5 is unnecessary.

The means 10 for prestressing contact a second surface 7 of the electromechanical transducer element 5 galvanically. The first surface 6 of the electromechanical transducer element 5 is electrically contacted by the ultrasonic window 4. For this, the first housing part 2 is produced especially of an electrically conductive material. In order to prevent a short circuit, the means 10 for prestressing are installed free of contact with the first housing part 2. Here, they are supported on a circuit board 13, which also serves as an electrical insulator. The electrical circuit is closed via an electrical resistor 12. Here the ultrasonic transducer 1 also includes a plug 16 in a bore in the second housing part 3, by which there occurs the electrical contacting and therewith the exciting by, and the tapping of, the voltage signals on the electromechanical transducer element 5. Electrical lines are not shown here in greater detail.

According to the invention, the first surface 6 of the electromechanical transducer element 5 is planar and the second surface 7 is divided into segments 9, here four equally large, quarter circle shaped segments 9. This happens in simple manner by one or more cuts 8 through the second surface 7 of the electromechanical transducer element 5.

An adapting, or matching, layer 11 for matching acoustic impedances is provided here outside of the housing of the ultrasonic transducer 1. It is so placed against the ultrasonic window 4 that the ultrasonic window 4 is located between the adapting, or matching, layer 11 and the electromechanical transducer element 5. The adapting, or matching, layer 11 contacts, thus, the fluid, whose flow is to be measured.

In the shown form of embodiment, the ultrasonic transducer 1 includes an axial stop 17 in the region of the second housing part 3, which can be tightened against an axial stop of a third housing part or a pipeline, for the installation of the ultrasonic transducer 1 into a pipeline. Axial stop 17 can be embodied as a sealing surface, or a seal is arranged between it and the axial stop of the third housing part or the pipeline, followed by tightening to compress the seal.

For positioning the electromechanical transducer element 5 at a predetermined position in the ultrasonic transducer 1 during the manufacturing process, centering lugs (not shown) can be provided in the first or second housing part 2 or 3.

Advantageous, additionally, is a smooth surface of the housing of the ultrasonic transducer 1. Thus, especially, the weld seam is not elevated relative to the lateral surface of the housing. A function of the distance of each section edge of an outer contour of the housing to a longitudinal axis of the housing is, thus, monotonic from the ultrasonic window 4 up to the axial stop 17, wherein the section edge lies in a plane, in which the longitudinal axis of the housing lies.

The invention claimed is:

1. An ultrasonic transducer for an ultrasonic flow measuring device, comprising:
    an ultrasonic window;
    prestressing means;
    an electromechanical transducer element, which is prestressed against said ultrasonic window of the ultrasonic transducer by said prestressing means, wherein:
    a first surface of the electromechanical transducer element faces the ultrasonic window; and
    a second surface of the electromechanical transducer element lying opposite said first surface is divided into a plurality of segments, which are galvanically connected with said prestressing means;

wherein said second surface of said electromechanical transducer element is divided into only four equally large segments.

2. The ultrasonic transducer as claimed in claim 1, wherein:
said prestressing means comprises a compression coil spring, which, for galvanic contacting of said electromechanical transducer element, has at least one complete winding extending in a plane.

3. The ultrasonic transducer as claimed in claim 1, further comprising:
coupling means arranged between said electromechanical transducer element and said ultrasonic window.

4. The ultrasonic transducer as claimed in claim 1, further comprising:
an adapting, or matching, layer, which interfaces the ultrasonic transducer with its environment, wherein:
said the ultrasonic window is arranged between said electromechanical transducer element and said adapting, or matching, layer.

5. The ultrasonic transducer as claimed in claim 4, wherein:
the adapting, or matching, layer comprises a composite matrix with therein embedded, spherically shaped bodies.

6. The ultrasonic transducer as claimed in claim 1, wherein:
said ultrasonic window galvanically contacts said first surface of said electromechanical transducer element; and
said ultrasonic window and said prestressing means are suitable for applying and/or tapping a voltage to, respectively from, said electromechanical transducer element.

7. The ultrasonic transducer as claimed in claim 6, wherein:
said prestressing means are galvanically connected with said ultrasonic window; and
said galvanic connection has a resistance of at least 50 ohm.

8. The ultrasonic transducer as claimed in claim 1, further comprising:
a housing, which surrounds said electromechanical transducer element, wherein:
said housing has lugs facing said electromechanical transducer element for centering said electromechanical transducer element in said housing.

9. The ultrasonic transducer as claimed in claim 1, further comprising:
a housing, which surrounds said electromechanical transducer element, wherein:
said housing has a beaker shaped, first housing part, whose floor forms said ultrasonic window, and a second housing part with an axial stop for securement of the ultrasonic transducer on a measuring tube;
a function of the distance of each section edge of an outer contour of said housing to a longitudinal axis of said housing is monotonic from said ultrasonic window up to the axial stop; and
the section edge lies in a plane, in which the longitudinal axis of said housing lies.

10. The ultrasonic transducer as claimed in claim 9, wherein:
said first housing part is connected with said second housing part by material bonding.

11. A method for manufacturing an ultrasonic transducer comprises: an ultrasonic window; prestressing means; an electromechanical transducer element, which is prestressed against said ultrasonic window of the ultrasonic transducer by said prestressing means, wherein: a first surface of the electromechanical transducer element faces the ultrasonic window; and a second surface of the electromechanical transducer element lying opposite said first surface is divided into a plurality of segments, which are galvanically connected with said prestressing means, the method comprising the steps of:
placing the electromechanical transducer element in the first or second housing part; and
welding the second housing part to the first housing part.

* * * * *